US009332434B1

(12) United States Patent
Dotan et al.

(10) Patent No.: US 9,332,434 B1
(45) Date of Patent: May 3, 2016

(54) POLICY BASED LOCATION COLLECTION FOR AUTHENTICATION

(71) Applicant: EMC Corporation, Hopkinton, MA (US)

(72) Inventors: Yedidya Dotan, Newton, MA (US); Lawrence N. Friedman, Arlington, MA (US); Shane Rice, Westwood, MA (US)

(73) Assignee: EMC Corporation, Hopkinton, MA (US)

( * ) Notice: Subject to any disclaimer, the term of this patent is extended or adjusted under 35 U.S.C. 154(b) by 128 days.

(21) Appl. No.: 14/144,940

(22) Filed: Dec. 31, 2013

(51) Int. Cl.
 *G06F 15/16* (2006.01)
 *H04W 12/06* (2009.01)
 *H04W 64/00* (2009.01)

(52) U.S. Cl.
 CPC .............. *H04W 12/06* (2013.01); *H04W 64/00* (2013.01)

(58) Field of Classification Search
 CPC ....... H04W 12/03; H04W 12/12; H04L 63/08
 USPC ....................... 455/410, 411, 412.2
 See application file for complete search history.

(56) References Cited

U.S. PATENT DOCUMENTS

| 8,483,139 | B2 * | 7/2013 | Gonikberg et al. ........... 370/328 |
| 8,800,027 | B1 | 8/2014 | Ackerman |
| 8,850,575 | B1 | 9/2014 | Magi Shaashua et al. |
| 8,918,844 | B1 | 12/2014 | Friedman et al. |

OTHER PUBLICATIONS

Triinu Magi Shaashua, "Method of Defining the User'S Geographic Areas for Risk Assessment Purposes in Mobile Channels", U.S. Appl. No. 13/340,829, filed Dec. 30, 2011.
Yedidya Dotan, "Access Control by a Mobile Device Using an Image", U.S. Appl. No. 14/041,103, filed Sep. 30, 2013.
Yedidya Dotan, "Proximity-Based Authentication", U.S. Appl. No. 13/837,675, filed Mar. 15, 2013.

\* cited by examiner

*Primary Examiner* — Sam Bhattacharya
(74) *Attorney, Agent, or Firm* — BainwoodHuang

(57) ABSTRACT

Improved techniques are directed to a method performed by a computing device of authenticating a mobile client device to a resource using location services. The method includes (a) receiving authentication requests from the mobile client device, the authentication requests each including a location freshness value indicating a respective amount of time that has passed since the mobile client device last determined its location, (b) testing the location freshness value received in each authentication request against a location freshness policy to generate a freshness result indicating whether the location freshness value complies with the location freshness policy, (c) generating an authentication response for each authentication request based at least in part on the location freshness result for that authentication request, and (d) directing the authentication response to be sent to the resource. A computerized apparatus and a computer program product for performing methods similar to that described above are also provided.

26 Claims, 5 Drawing Sheets

POLICY BASED LOCATION COLLECTION FOR AUTHENTICATION

BACKGROUND

Many resources, such as data, applications, and services, are available over the Internet to allow users to access the resources remotely. When the resources are security-sensitive, authentication procedures are commonly implemented to ensure that only properly-authenticated individuals are able to access the secure resources. Authentication is often performed by requiring users each to enter a username and password. In some systems, additional factors may be considered when authenticating users.

In one conventional system, a mobile device operated by a user sends its current location information, as determined by using the Global Positioning System (GPS) running on the mobile device, to an authentication server during an authentication process. The authentication process is then able to include the mobile device's location in assessing the user's authenticity. For example, the authentication process may reject authentication requests received from the mobile device when the mobile device is outside a predetermined area.

SUMMARY

Unfortunately, the above-described GPS location services can consume a great deal of power and can be slow to acquire location coordinates, particularly when there is poor satellite reception. Thus, obtaining GPS location information whenever the authentication process requests such information may quickly drain the battery of the mobile device. Further, requests for location information may introduce long delays or even authentication failures when satellite reception is too weak for the mobile device to obtain GPS location information within a specified time-out. It would therefore be desirable to limit the necessity of obtaining fresh GPS readings from mobile devices each time authentication is required while continuing to provide the authentication process with the location information it needs to authenticate users.

To address the above-described deficiencies in the prior approach, improved techniques are provided for allowing an authentication process to use earlier-acquired location information from a mobile device as long as the mobile device acquired the location information within a designated freshness interval. Improved techniques are also provided for using location determination methods besides GPS when GPS signals are weak. In some embodiments, improved techniques are presented for automatically determining the required freshness interval and/or permissible location determination methods based on additional factors.

One embodiment of the improved techniques is directed to a method performed by a computing device of authenticating a mobile client device to a resource using location services. The method includes (a) receiving authentication requests from the mobile client device, the authentication requests each including a location freshness value indicating a respective amount of time that has passed since the mobile client device last determined its location, (b) testing the location freshness value received in each authentication request against a location freshness policy to generate a freshness result indicating whether the location freshness value complies with the location freshness policy, (c) generating an authentication response for each authentication request based at least in part on the location freshness result for that authentication request, and (d) directing the authentication response to be sent to the resource. Other embodiments are directed to a system, a computerized apparatus, and a computer program product for performing methods similar to that described above.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments are directed to improved techniques for allowing an authentication process to use earlier-acquired location information from a mobile device as long as the mobile device acquired the location information within a designated freshness interval. Improved techniques are also directed to using location determination methods aside from Global Positioning System (GPS) when GPS signals are weak. In some embodiments, improved techniques are presented for automatically determining the required freshness interval and/or permissible location determination methods based on additional factors.

Figure 1:
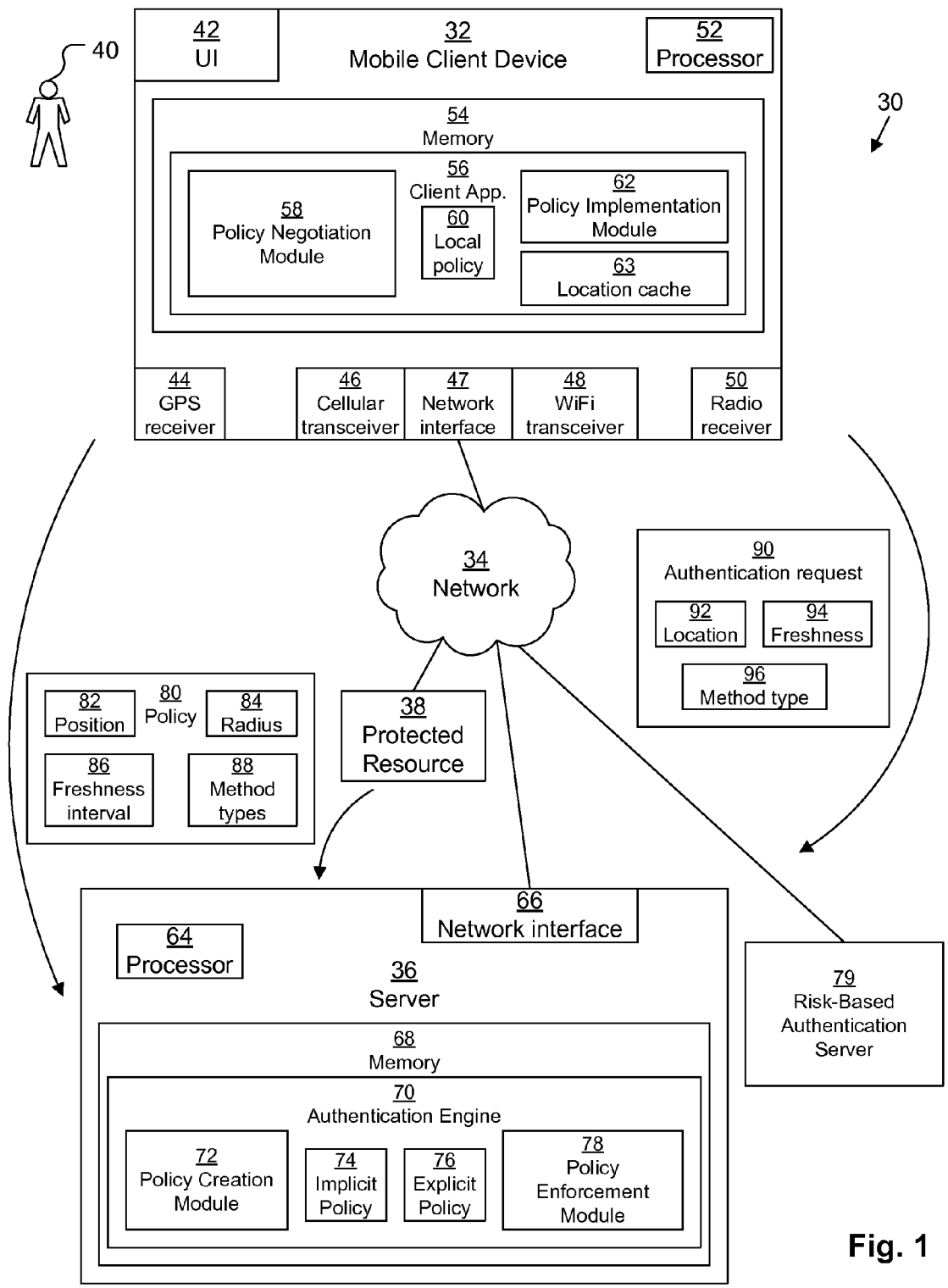
FIG. 1 depicts an example system for use in performing various embodiments.

FIG. 1 depicts an example system 30 for use in allowing a user 40 of a mobile client device 32 to access a protected resource 38 across a network 34 with the assistance of a server 36 and, in some embodiments, a risk-based authentication server 79.

The mobile client device 32 may be any kind of computing device, such as, for example, a personal computer, a workstation computer, a server computer, an enterprise server computer, a laptop computer, a tablet computer, a smart phone, etc. Typically, however, the mobile client device 32 will be a laptop computer, a tablet computer, or a smart phone, which are easily movable. Mobile client device 32 includes a user interface (UI) 42, via which it communicates with a user 40. UI 42 may take various forms, depending on the implementation. In one implementation (e.g., when the mobile computing device 32 is a smart phone or a tablet), UI 42 includes a touch-sensitive display screen embedded within the device together with circuitry for displaying information on the display screen and circuitry for receiving touch commands from the user 40. In another implementation, UI 42 includes interface circuitry (e.g., a graphics adapter, a various bus ports, etc.) to allow the mobile client device 32 to interface with the user 40 via user input/output devices (e.g., display screens, keyboards, mice, printers, track pads, etc.).

The mobile client device 32 also includes one or more of a GPS receiver 44 (or, generically, any satellite-based location determination system receiver), a cellular transceiver 46 for allowing the mobile client device 32 to communicate with cellular telephone and data networks by means of cell towers using radio waves (for example, in the range of 698 MHz to 2.7 GHz), a WiFi (Wireless Fidelity) transceiver 48 for allowing the mobile client device 32 to communicate with wireless access points using a wireless protocol using radio waves (for example, in the range of 2.4 GHz to 50 GHz) such as defined by the IEEE 802.11 standards, and a radio receiver 50 for receiving radio broadcasts in the AM and FM bands. These receiver/transceiver devices 44, 46, 48, 50 may also be used to acquire location information of the mobile client device 32, as described below in further detail. Mobile client device 32 typically contains a network interface device 47 to allow communication with network 34. In some implementations, network interface 47 may be implemented using cellular transceiver 46 or WiFi transceiver 48 to allow for cellular network communication or wireless network communication, respectively. In other implementations, network interface 47 may be implemented as a wired network interface device, such as, for example, an Ethernet adapter.

Mobile client device 32 also includes a processor 52 and memory 54. Processor 52 may be any kind of processor or set of processing units configured to perform operations, such as, for example, a microprocessor, a multi-core microprocessor, a digital signal processor, a system on a chip, a collection of electronic circuits, a similar kind of controller, or any combination of the above.

Memory 54 may include any kind of digital system memory, such as, for example, random access memory (RAM). Memory 54 stores an operating system (OS) (e.g., Linux, UNIX, Windows, Android, iOS, etc.) and one or more applications executing on processor 52 as well as data used by those programs. One such application, running on processor 52 and stored within memory 54, is client application 56, which allows the mobile client device 32 to manage access to protected resource 38. Client application 56 may include a policy negotiation module 58 to negotiate a policy 80 with server 36. Client application 56 also includes a local policy 60, a policy implementation module 62, and an optional location cache 63.

Memory 54 may include both a system memory portion for storing programs and data in active use by the processor 52 as well as a persistent storage portion (e.g., solid-state storage and/or disk-based storage) for storing programs and data even while the mobile client device 32 is powered off. The operating system and the applications (e.g., client application 56) are typically stored both in system memory and in persistent storage so that they may be loaded into system memory from persistent storage upon a system restart. These applications, when stored in non-transient form either in system memory or in persistent storage, form a computer program product. The processor 52 running one or more of these applications thus forms a specialized circuit constructed and arranged to carry out the various processes described herein.

Network 34 may be any kind of data communication network, such as for example the Internet, a local area network (LAN), a wide area network, a storage area network (SAN), a virtual private network (VPN), a cellular data network, a wireless LAN, an interconnected fabric of connections and switches, similar systems, and combinations thereof. Typically, network 34 includes a cellular network or a wireless LAN as well as the Internet, to which the cellular network or a wireless LAN provides access.

Server 36 may be any kind of computing device, such as, for example, a personal computer, a workstation computer, a server computer, an enterprise server computer, a laptop computer, a tablet computer, a smart phone, etc. Typically, however, the server 36 will be a server computer. Server 36 includes a processor 64, a network interface 66, and memory 68. Network interface 66 interfaces with network 34. Network interface 66 may include an Ethernet adapter, a cellular modem, a WiFi wireless networking adapter, any other device for connecting to a network 34, or some combination thereof. Processor 64 may be any kind of processor or set of processing units configured to perform operations, such as, for example, a microprocessor, a multi-core microprocessor, a digital signal processor, a system on a chip, a collection of electronic circuits, a similar kind of controller, or any combination of the above.

Memory 68 may include any kind of digital system memory, such as, for example, RAM. Memory 68 stores an OS (e.g., Linux, UNIX, Windows, Android, iOS, etc.) and one or more applications executing on processor 64 as well as data used by those programs. One such application, running on processor 64 and stored within memory 68, is authentication application 70, which manages access to protected resource 38. Authentication application 70 includes a policy creation module 58 to negotiate a policy 80 with either mobile client application 56 or with an administrator of the protected resource 38. Authentication application 70 also includes a policy enforcement module 78, an explicit policy 76, and, in some embodiments, an implicit policy 74.

Memory 68 may include both a system memory portion for storing programs and data in active use by the processor 64 as well as a persistent storage portion (e.g., solid-state storage and/or disk-based storage) for storing programs and data even while the server 36 is powered off. The operating system and the applications (e.g., authentication application 70) are typically stored both in system memory and in persistent storage so that they may be loaded into system memory from persistent storage upon a system restart. These applications, when stored in non-transient form either in system memory or in persistent storage, form a computer program product. The processor 64 running one or more of these applications thus forms a specialized circuit constructed and arranged to carry out the various processes described herein.

Risk-based authentication server 79 is a computing device configured to perform risk-based analysis of authentication requests based on various factors in order to decide in a statistical manner whether the user 40 is who the user 40 claims to be.

It should be understood that although system 30 is depicted as being distributed across a network 34, this is by way of example only. It is also possible for one or both of the protected resource 38 and the server 36 to be replaced by one or more software modules having similar respective functionalities running on the mobile client device 32. Thus, in some embodiments, authentication application 70 and its various components may run on the mobile client device 32 instead of on the server 36.

It should be understood that although authentication application 70 has been depicted as operating on server 36, in some embodiments, authentication application 70 may instead run on the mobile client device 32.

In operation, a policy must be negotiated and established as an initial matter. In one embodiment, the user 40 operates the policy negotiation module 58 on mobile client device 32 to send a proposed policy 80 to the server 36. The proposed policy 80 may be either explicit or implicit. When implicit, proposed policy 80 includes one or more allowable positions 82 as well as a radius 84 around each allowable position 82 from which the mobile client device 32 is permitted to access the resource 38. When the proposed policy 80 is explicit, it also contains a freshness interval 86, and, in some embodiments, a set of method types 88. Policy creation module 72 of the server 36 receives the proposed policy 80 and saves it locally as implicit policy 74 (if the proposed policy 80 is implicit) or explicit policy 76 (if the proposed policy 80 is explicit).

If the proposed policy 80 is implicit, then policy creation module 72 must concretize the implicit policy 74 into an explicit policy 76. In some embodiments, this is done once, upon receipt of the proposed policy 80, while in other embodiments, it is done repeatedly, such as every time there is a new authentication request. In order to concretize the policy, the policy creation module 72 applies a set of rules to establish the freshness interval 86 (and, in some embodiments, the set of method types 88) based, at least in part, on the radius 84. In some embodiments, the policy creation module 72 also bases this determination on the size of the allowable position 82 (e.g., whether it is a spot or a large area such as an entire city or state) and various other factors. The policy negotiation module 58 on the mobile client device 32 also concretizes its own local version of policy 60 in a similar manner using the same set of rules so that, at any given time, the local policy 60 on the mobile client device 32 is identical to the concretized explicit policy 76 on the server 36.

Thus, for example, if the protected resource 38 is an online banking system, the user 40 may, upon setting up his account, indicate that he plans to access his account from his hometown as well as from his work office building in another town. The policy negotiation module 58 would then send the proposed policy 80 to the server 36 listing the hometown as a first allowable position 82 and a first radius 84 of 2 miles around the hometown (in case the user goes on errands in a bordering town while accessing the website) as well as the office building as a second allowable position 82 and a second radius 84 of 100 feet around the office building. The policy creation module 72 and the policy negotiation module 58 are then both able to use the information in the implicit policy 74 (as well as, in some embodiments, other values, such as a reported current velocity of the mobile computing device 32) to assign concrete values to the freshness interval 86 and the set of method types 88. Since the office building position/radius is relatively small, a relatively short freshness interval (e.g., 1 minute, indicating that a cached location stored in location cache 63 may remain valid for up to 1 minute) may be set for that office building position/radius. Since the hometown position/radius is relatively large, relatively larger freshness interval (e.g., 5 minutes, indicating that a cached location stored in location cache 63 may remain valid for up to 5 minutes) may be set for that hometown position/radius. Similarly, because the office building position/radius is relatively small, the set of method types 88 may be set to indicate that only GPS (using GPS receiver 44) may be used to establish the location of the mobile client device 32. However, because the hometown position/radius is relatively large, the set of method types 88 may be set to indicate that cell tower triangulation (using cellular transceiver 46) may also be used as a fallback method to establish the location of the mobile client device 32 in case a GPS determination times out.

In some embodiments, instead of the mobile client device 32 sending the proposed policy 80 to the server 36, an administrator of the protected resource 38 may set and send the proposed policy 80 to the server 36. Thus, for example, a system administrator of a corporate network may establish that employees may only access corporate data from within the corporate headquarters building.

When the user 40 wishes to access protected resource 38, policy implementation module 62 of the mobile client device 32 sends an authentication request 90 to the server 36. Policy implementation module 62 is able to make sure that the local policy 60 is enforced. Thus, the authentication request 90 includes a location 92 having a freshness 94 (e.g., 30 seconds old) that complies with the freshness interval 86. In addition, the authentication request 90 includes an indication of the method type 96 that was used to establish the location 92. The policy implementation module 62 is able to ensure that method type 96 is consistent with the set of method types 88. Then, the policy enforcement module 78 of the server 36 is able to verify that the location 92 falls within the allowable position 82 and radius 84 specifications and that the freshness 94 and method type 96 are consistent with the freshness interval 86 and the set of method types 88, respectively. If so, the authentication engine 70 is able to authenticate the user 40, and an authentication response (not depicted) can be directed to the protected resource 38 (either directly or by means of a certificate returned to the mobile client device 32 to be used in accessing the protected resource 38). If multi-factor authentication is being used, then authentication engine 70 authenticates the user if the location-related information is correct and other factors are also validated (e.g., correct password is supplied for a username). If risk-based authentication is being used, then authentication engine 70 sends validation of the location-related information to the risk-based authentication server 79 for final analysis prior to an authorization determination being made.

Figure 2A:
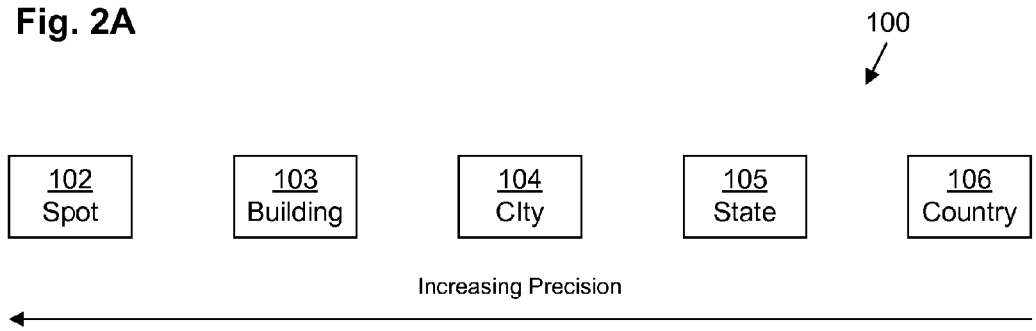
FIGS. 2A-2D depict various example precision schemes used in the context of various embodiments.

FIG. 2A indicates a hierarchy 100 of different types of allowable positions 82 that may be specified in a policy 80. The least precise kind of allowable position 82 is an entire country 106, followed by a state 105, a city 104, a building 103, and then the most precise spot 102.

Figure 2B:
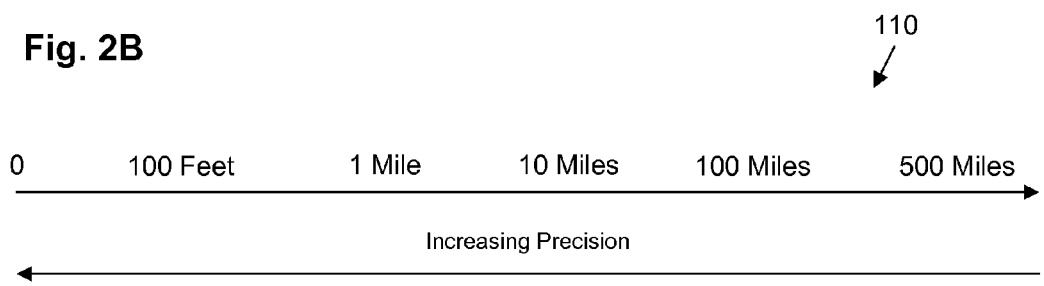

FIG. 2B indicates the inverse relationship 110 between the radius 84 specified in the policy 80 and the precision of that radius 84. Thus, a radius 84 of 0 is extremely precise, while a radius 84 of 500 miles is extremely imprecise.

Figure 2C:
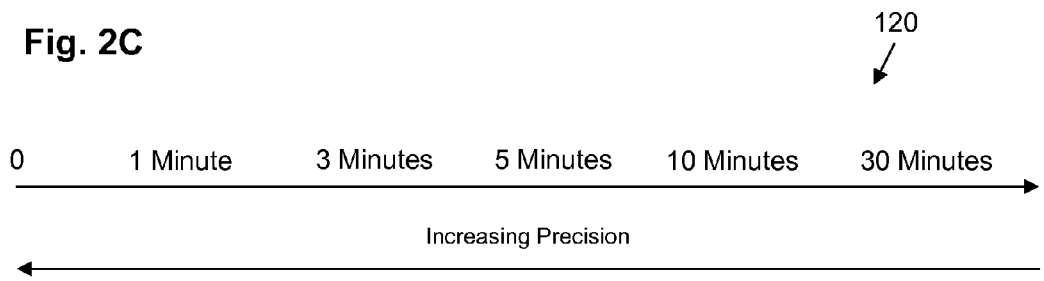

FIG. 2C indicates the inverse relationship 120 between the freshness interval 86 specified in the policy 80 and the precision of that freshness interval 86. Thus, a freshness interval 86 of 0 is extremely precise, while a freshness interval 86 of 30 minutes is extremely imprecise. It should be noted that a freshness interval 86 of 0 does not involve any caching in location cache 63, but longer freshness intervals 86 do utilize the location cache 63.

Figure 2D:
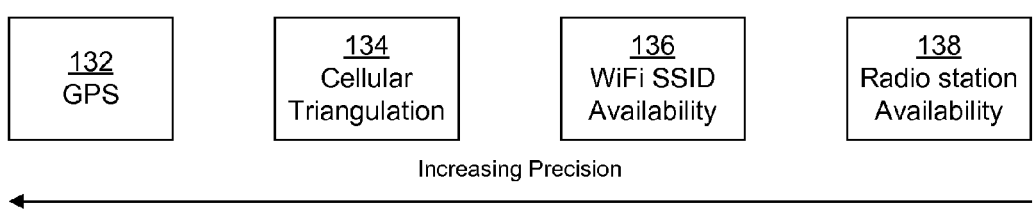

FIG. 2D indicates a hierarchy 130 of different types of types 96 of methods that could be found within the method types 88 that may be specified in the policy 80. The most precise method type 96 is GPS location determination 132, which is often accurate to within about 10 feet, depending on the quality of the GPS receiver 44. Less precise is cellular triangulation location determination 134, in which cellular transceiver 46 is used to measure signal delays from nearby cell towers with known locations to allow triangulation to be performed. The accuracy of cellular triangulation 134 may vary depending on the structure of the cellular network, but it is generally far less accurate than GPS 132. Less precise is WiFi Service Set Identifier (SSID) availability location determination 136, in which the WiFi transceiver 48 is used to obtain a list of broadcast wireless network names (e.g., SSIDs) within range of the WiFi transceiver 48. If the set of SSIDs within range includes all (or, in some embodiments, most) of an expected set of SSIDs that are predetermined to be in range of the allowable position 82 (and its associated radius 84), then WiFi SSID availability location determination 136 will return an indication that the mobile client device 32 is within the radius 84 of the allowable position 82; otherwise it will not. The precision of WiFi SSID availability location determination 136 is difficult to assign definitively, but is typically on the order of a few hundred feet. However, it is susceptible to spoofing in that a fraudulent user 40 may fool the system into reporting a false location 92 by setting up wireless access points in the vicinity of the mobile client device with the proper SSIDs. This susceptibility to spoofing may be avoided if a secure version of WiFi SSID availability location determination 136 is used in which each wireless access point broadcasts an encrypted time-dependent signature. The least precise method type 96 is radio station availability location determination 138, in which the radio receiver 50 is used to obtain a list of broadcast radio stations (e.g., AM or FM or both) within range of the radio receiver 50. If the set of radio stations within range includes all (or, in some embodiments, most) of an expected set of radio stations that are predetermined to be in range of the allowable position 82 (and its associated radius 84), then radio station availability location determination 138 will return an indication that the mobile client device 32 is within the radius 84 of the allowable position 82; otherwise it will not. Due to the shorter broadcast range, FM-based radio station availability location determination 138 is more accurate than AM-based radio station availability location determination 138, but even FM-based radio station availability location determination 138 is typically only accurate to within about 10-20 miles.

Figure 3A:
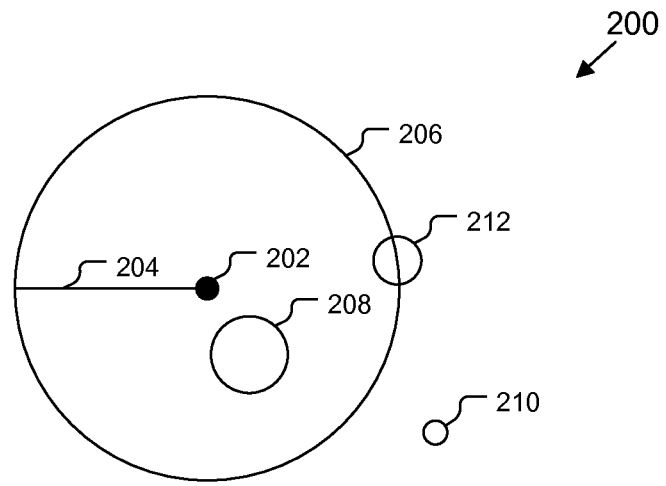
FIGS. 3A-3B depict various example locations and acceptable radii as well as example location determinations, according to various embodiments.

FIG. 3A depicts an example scenario 200 in which embodiments may be implemented. Point 202 represents an example allowable position 82. In this case, allowable position 82 is a spot 102 from hierarchy 100 (see FIG. 2A). Distance 204 represents radius 84 around point 202, which defines the circular area 206 from within which the mobile client device 32 is permitted to access the resource 38. Circles 208, 210, 212 represent various location determinations that mobile client device 32 may make at various points in time. Location determination 208 is a relatively large circle, indicating that the location of the mobile client device has not been determined very precisely—using an imprecise method type 96 along method hierarchy 130 (e.g., radio station availability 138), so the true location of the mobile client device 32 may, in fact, be anywhere within the circle of location determination 208. Since it is entirely within circular area 206, the mobile client device 32 will be authenticated if the location determination 208 is a within the permitted set of method types 88 and passes freshness (not depicted).

Location determination 210 is a relatively small circle, indicating that the location of the mobile client device has been determined very precisely—using an precise method type 96 along method hierarchy 130 (e.g, GPS 132), so the true location of the mobile client device 32 may, in fact, be anywhere within the small circle of location determination 210. Since it is entirely outside of circular area 206, the mobile client device 32 will generally not be authenticated.

Location determination 212 is a circle of intermediate size, indicating that the location of the mobile client device has been determined with intermediate precision—using an intermediate method type 96 along method hierarchy 130 (e.g, cellular triangulation 134), so the true location of the mobile client device 32 may, in fact, be anywhere within the intermediately-sized circle of location determination 212. Since it is partially inside and partially outside of circular area 206, whether or not the mobile client device 32 will be authenticated may depend on whether the policy 76 permits border cases.

Figure 3B:
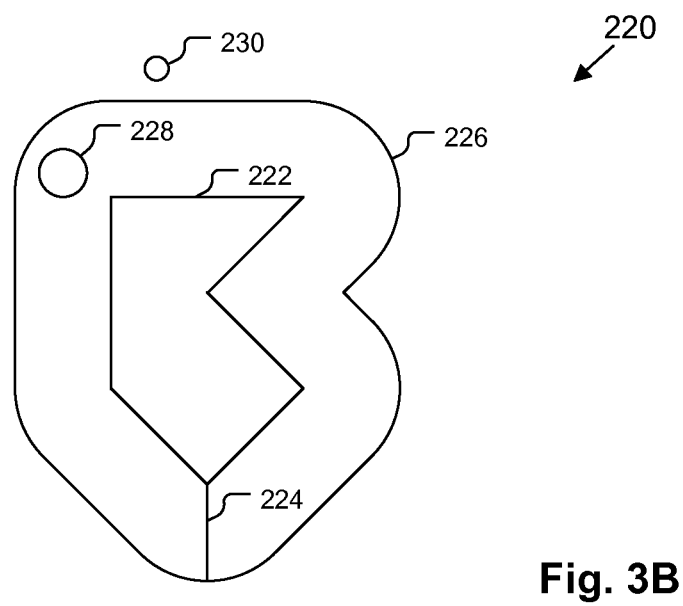

FIG. 3B depicts another example scenario 220 in which embodiments may be implemented. Polygon 222 represents an example allowable position 82. In this case, allowable position 82 may be a building 103, a city 104, a state 105, or a country 106 from hierarchy 100 (see FIG. 2A). Distance 224 represents radius 84 around polygon 222, which defines the permitted area 226 from within which the mobile client device 32 is permitted to access the resource 38. Circles 228, 230 represent various location determinations that mobile client device 32 may make at various points in time. Location determination 228 is an intermediately-sized circle, indicating that the location of the mobile client device has been determined with intermediate precision—using an intermediate method type 96 along method hierarchy 130 (e.g, cellular triangulation 134), so the true location of the mobile client device 32 may, in fact, be anywhere within the intermediately-sized circle of location determination 228. Since it is entirely within permitted area 226, the mobile client device 32 will be authenticated if the location determination 228 is a within the permitted set of method types 88 and passes freshness (not depicted).

Figure 4:
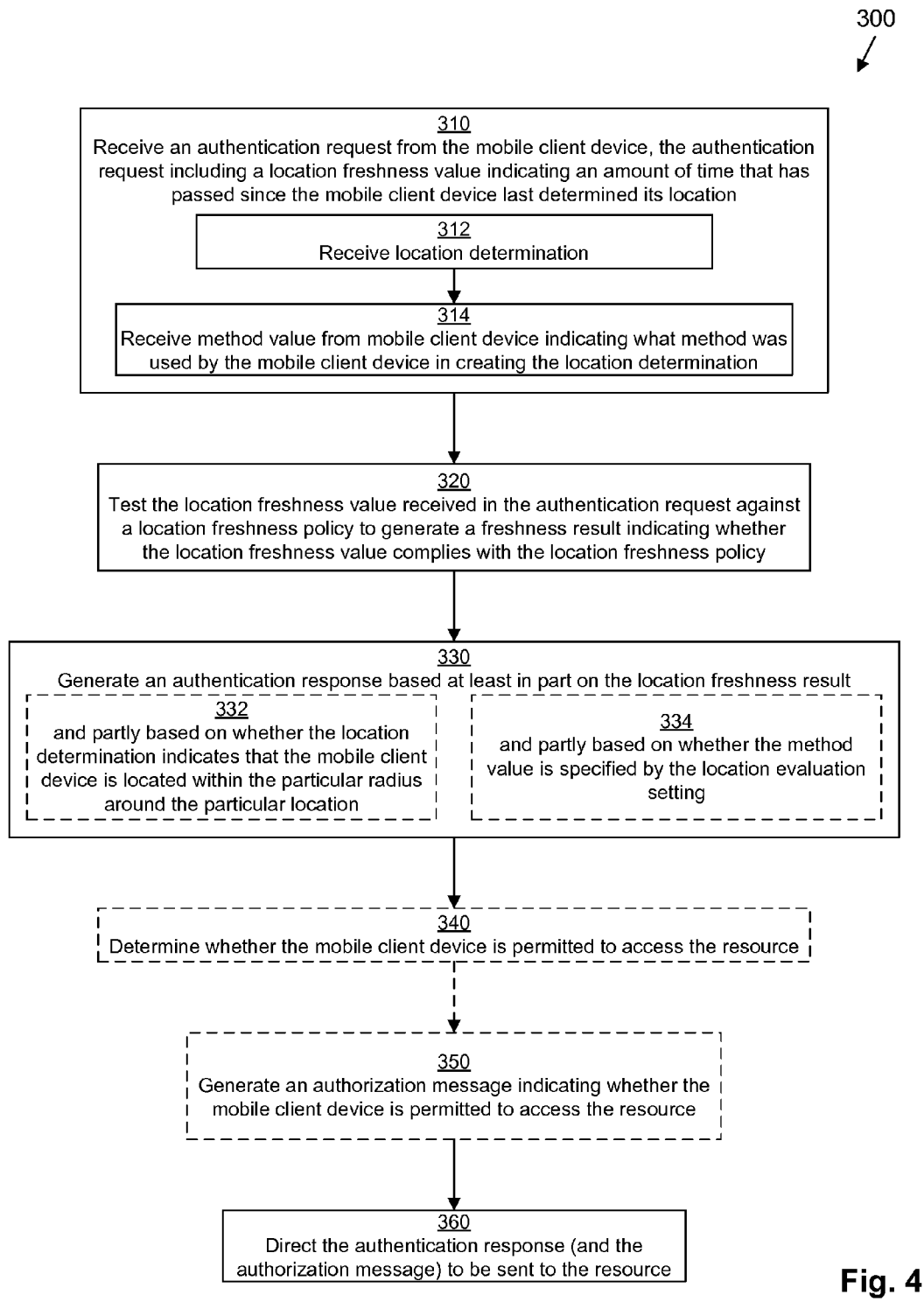
FIG. 4 depicts an example method according to various embodiments.

FIG. 4 depicts an example method 300 performed by server 36 for authenticating a user 40 in conjunction with an authentication request 90. It should be understood that any time an application, such as, for example, authentication engine 70, policy creation module 72, policy enforcement module 78, client application 56, policy negotiation module 58, or policy implementation module 62 is described as performing a method, process, step, or function, in actuality what is meant is that a computing device (e.g., server 36 or mobile client device 32) on which that application is running performs the method, process, step, or function when executing that piece of software on its processor (e.g., processor 52, 64).

In step 310, authentication module 78 receives authentication request 90 from the mobile client device 32, the authentication request 90 including a location freshness value 94 indicating the amount of time that has passed since the mobile client device 32 last determined its location 92. If the location freshness value 94 is not zero, then the location 92 will have come from the location cache 63 of the mobile client device 32.

In some embodiments, authentication module 78, in addition to including the location freshness value 94, also contains the determined location 92 (see sub-step 312).

In some embodiments, authentication module 78 further contains the method type indication 96 (see sub-step 314), which indicates what kind of location determination method (e.g., 132, 134, 136, or 138) was used by the mobile client device 32 to determine its location 92.

In step 320, policy enforcement module 78 tests the location freshness value 94 from the authentication request 90 against the freshness interval 86 stored in explicit policy 76 to generate a freshness result indicating whether the location freshness value 94 complies with the freshness interval 86. Thus, for example, if the freshness interval 86 is 1 minute and the location freshness value 94 from the authentication request 90 indicates that the mobile client device 32 last determined its location 92 two minutes ago, then the policy enforcement module 78 generates a freshness result indicating that the location freshness value 94 does not comply with the freshness interval 86.

In step 330, policy enforcement module 78 generates an authentication response based at least in part on the location freshness result from step 320. Thus, typically, if the location freshness result from step 320 is negative, the authentication response will be negative (except in embodiments in which a challenge may be issued to seek further identifying data from the user 40 in the event that location services fail). If the location freshness result from step 320 is affirmative, however, then typically additional factors will be considered before policy enforcement module 78 is able to decide whether to generate an affirmative or negative authentication response, as discussed in further detail below.

In step 360, authentication engine 70 directs the authentication response generated in step 330 to be sent to the protected resource 38. In some embodiments, authentication engine 70 sends the authentication response directly to the protected resource 38, while in other embodiments, authentication engine 70 sends the authentication response to the mobile client device 32 as a signed certificate, which mobile client device 32 may then present to the protected resource 38 when it wishes to access the protected resource.

Several omitted steps within method 300 will be discussed in further detail in connection with FIG. 5.

Figure 5:
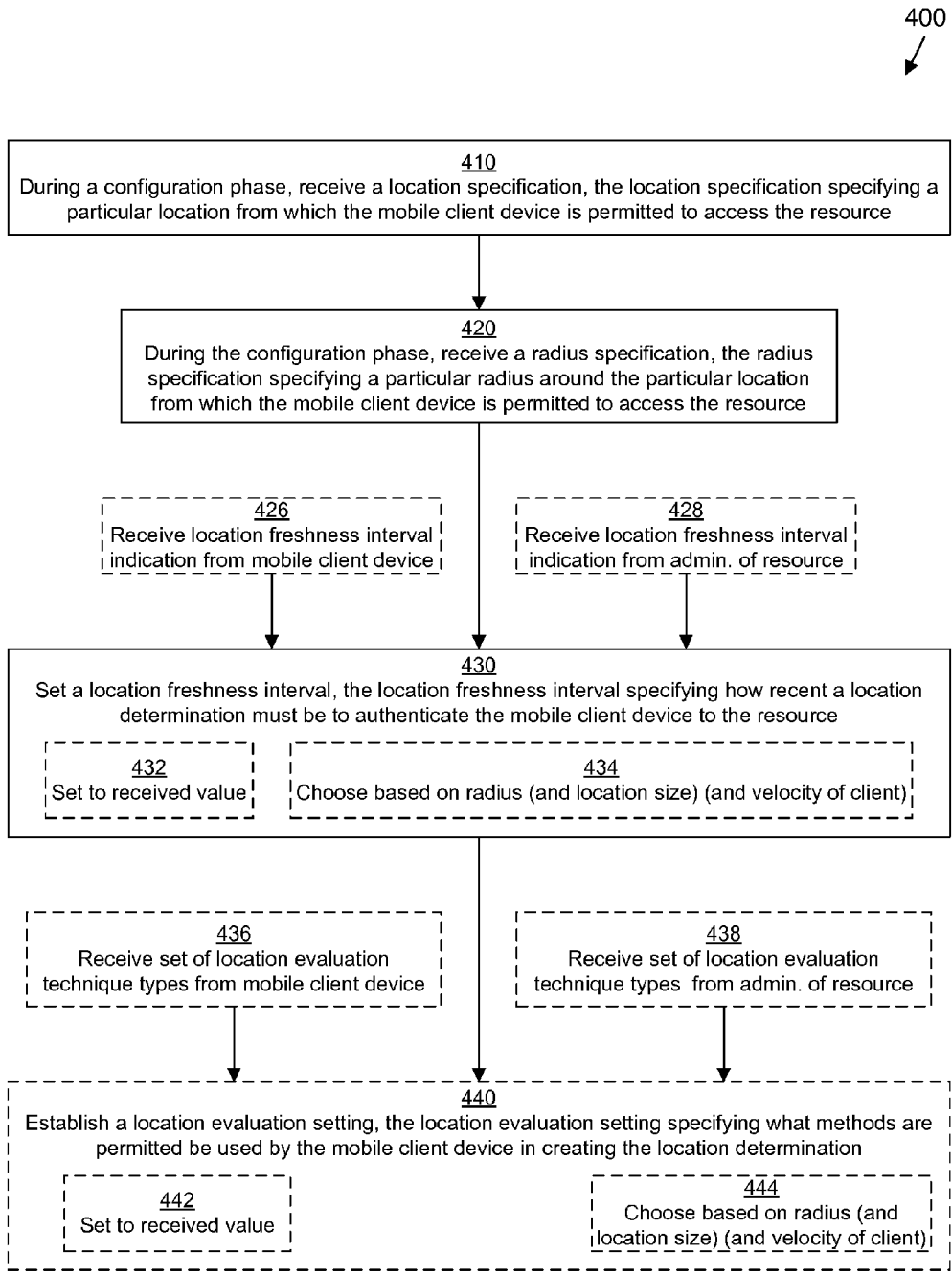
FIG. 5 depicts another example method according to various embodiments.

FIG. 5 depicts an example method 400 performed by server 36 for configuring an explicit policy 76 for user 40 attempting to access protected resource 38. Method 400 is typically performed prior to step 300.

In step 410, during a configuration phase of system 30 (e.g., when the user 40 first sets up access to protected resource 38 or when an administrator of protected resource 38 first sets the user 40 up with access to the protected resource 38), authentication engine 70 receives a location specification (e.g., position 82 within proposed policy 80) specifying from where the mobile client device 32 is permitted to access the protected resource 38. Recall that proposed policy 80 can be received either from the mobile client device 32 or from an administrator of protected resource 38.

In step 420, also during the configuration phase, authentication engine 70 receives a radius specification (e.g., radius 84 within proposed policy 80) specifying how far from the position 82 that the mobile client device 32 may still be permitted to access the protected resource 38 from.

If the position 82 and the radius 84 are the only values received within proposed policy 80, then steps 410-420 allow the policy creation module 72 to set the position 82 and radius within implicit policy 74. Otherwise, if additional values are received within proposed policy 80, steps 410-420 allow the policy creation module 72 to set the position 82 and radius within explicit policy 76. In the case of an explicit policy 76, during the configuration phase, a freshness interval 86 is also received by the authentication engine 70—either from the mobile client device 32 (step 426) or from an administrator of protected resource 38 (step 428).

In step 430, policy creation module 72 sets the freshness interval 86 within either implicit policy 74 or explicit policy 76, as the case may be. In the case of explicit policy 76, policy creation module 72 executes sub-step 432 during the configuration phase by setting the freshness interval 86 to the value received in step 426 or 428.

In the case of an implicit policy 74, policy creation module 72 executes sub-step 434 to concretize the implicit policy 74 by choosing the freshness interval 86 based on the received radius 84, and in some embodiments, also based on a size of the position 82 (e.g., based on where along hierarchy 100 the type of position falls) and/or a current velocity of the mobile client device 32.

In sub-step 434, policy creation module 72 may choose the freshness interval 86 according to a positive correlation relationship between the radius 84 and the freshness interval 86 (i.e., as the radius 84 increases, the freshness interval 86 also tends to increase). If the size of the position 82 is also used, then policy creation module 72 may refine the freshness interval 86 according to a positive correlation relationship between the size of the position 82 and the freshness interval 86 (i.e., as the size of the position 82 increases along hierarchy 100, the freshness interval 86 also tends to increase). If the current velocity of the mobile client device 32 is also used, then policy creation module 72 may refine the freshness interval 86 according to a negative correlation relationship between the current velocity of the mobile client device 32 and the freshness interval 86 (i.e., as the current velocity of the mobile client device 32 increases, the freshness interval 86 tends to decrease). It should be understood that the various factors may be combined in various ways as is well-understood in the art.

Sub-step 434 may, in some embodiments (e.g., when the current velocity is not used), be performed during the configuration phase, while, in other embodiments (e.g., when the current velocity is used), sub-step 434 may be performed after the configuration phase, such as just prior to performing an authentication. In the latter embodiments, the mobile client device 32 would report its current velocity to the server 36, for example, in every authentication request 90.

In some embodiments, set of method types 88 is also part of the implicit or explicit policy 74, 76 stored on server 36. In the case of an explicit policy 76, during the configuration phase, a set of location evaluation technique types is also received by the authentication engine 70—either from the mobile client device 32 (step 436) or from an administrator of protected resource 38 (step 438). In step 440, policy creation module 72 establishes the set of method types 88 within either implicit policy 74 or explicit policy 76, as the case may be. In the case of explicit policy 76, policy creation module 72 executes sub-step 442 during the configuration phase by establishing the set of method types 88 to the set of location evaluation technique types received in step 436 or 438.

In the case of an implicit policy, policy creation module 72 executes sub-step 444 to choose the set of method types 88 based on the received radius 84, and in some embodiments, also based on a size of the position 82 (e.g., based on where along hierarchy 100 the type of position falls) and/or a current velocity of the mobile client device 32.

In sub-step 444, policy creation module 72 may choose the set of method types 88 by selecting a set of method types 88 including one or more method types 96 that fall on the more precise side of hierarchy 130 if the radius 84 is small, and selecting a broader set of method types 88 that also include one or more method types 96 that fall on the less precise side of hierarchy 130 if the radius 84 is large. Thus, for example, if the radius 84 is 0, then the set of method types 88 may only include GPS location determination 132, but if the radius 84 is 1 mile, then the set of method types 88 may include both GPS location determination 132 and cellular triangulation location determination 134. Continuing in the example, if the radius 84 is 100 miles, then the set of method types 88 may include GPS location determination 132, cellular triangulation location determination 134, and radio station availability location determination 138. Typically, the method types 96 in the set of method types 88 are arranged in an order or preference. Thus, GPS location determination 132 is usually attempted first, but a timeout period is specified (e.g., 20 second), and if it times out (most likely due to poor satellite reception), the other method types 96 are used as fallbacks.

If the size of the position 82 is also used, then policy creation module 72 may refine the set of method types 88 based on the size of the position 82. Thus, as the size of the position 82 increases along hierarchy 100, less precise location determination techniques along hierarchy 130 may be added to the set of method types 88. If the current velocity of the mobile client device 32 is also used, then policy creation module 72 may refine the set of method types 88 inversely based on the current velocity of the mobile client device 32. Thus, as the current velocity of the mobile client device 32 increases, less precise location determination techniques along hierarchy 130 may be removed from the set of method types 88. It should be understood that the various factors may be combined in various ways as is well-understood in the art.

Sub-step 444 may, in some embodiments (e.g., when the current velocity is not used), be performed during the configuration phase, while, in other embodiments (e.g., when the current velocity is used), sub-step 444 may be performed after the configuration phase, such as just prior to performing an authentication. In the latter embodiments, the mobile client device 32 would report its current velocity to the server 36, for example, in every authentication request 90.

Returning to FIG. 4, in step 330, generating the authentication response may also be based on an evaluation of the location 92 of the mobile client device in the context of position 82 and radius 84 (sub-step 332) and/or an evaluation of whether the method type 96 used by the mobile client device 32 to determine its location 92 is found within the set of method types 88 from the policy 74, 76 (sub-step 334). Thus, in sub-step 332, if the location 92 is more than the radius 84 outside the position 82, then the authentication response will generally be negative (unless a challenge is used). Similarly, in sub-step 334, if the mobile client device 32 used a method type 96 to establish its position 82 that is not within the allowed set of method types 88, then the authentication response will generally be negative (unless a challenge is used).

In addition, in optional step 340, server 36 uses the authentication response (as well as other factors, such as a database of authorized users) to determine if the user 40 is authorized to access the protected resource 38. Then, in optional step 350, server 36 generates an authorization message based on the decision from step 340. Then, in step 360, the authorization message may also be sent to the protected resource 38 tother with the authentication response.

Thus, techniques have been described allowing an explicit or an implicit policy 74, 76 to dictate how fresh a cached location reading (e.g., in location cache 63) must be to properly authenticate a location 92 in a multi-factor authentication context. Improved techniques are also provided for allowing the policy 80 to dictate whether other faster and less power hungry (but also less precise) location determination methods may be used instead of GPS when the GPS signal is too weak. In some embodiments, improved techniques are presented for automatically determining the required freshness 86 and/or permissible location determination methods 88 for the policy 80 based on other factors recorded in an implicit manner.

While various embodiments of the present disclosure have been particularly shown and described, it will be understood by those skilled in the art that various changes in form and details may be made therein without departing from the spirit and scope of the present disclosure as defined by the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "conventional," Applicants make no admission that such technique, method, apparatus, or other concept is actually prior art under 35 U.S.C. §102 or 35 U.S.C. §103, such determination being a legal determination that depends upon many factors, not all of which are known to Applicants at this time.

What is claimed is:

1. A method, performed by a computing device, of authenticating a mobile client device to a resource using location services, the method comprising:
  receiving authentication requests from the mobile client device, the authentication requests each including a location freshness value indicating a respective amount of time that has passed since the mobile client device last determined its location;
  testing the location freshness value received in each authentication request against a location freshness policy to generate a freshness result indicating whether the location freshness value complies with the location freshness policy;
  generating an authentication response for each authentication request based at least in part on the location freshness result for that authentication request; and
  directing the authentication responses to be sent to the resource.

2. The method of claim 1 wherein the method further comprises, by the computing device, during a configuration phase, receiving a setting of the location freshness policy from the mobile client device.

3. The method of claim 1 wherein the method further comprises, by the computing device, during a configuration phase, receiving a setting of the location freshness policy from an administrator of the resource.

4. The method of claim 1,
  wherein the method further comprises:
    during a configuration phase, receiving a location specification, the location specification specifying a particular location from which the mobile client device is permitted to access the resource;
    during the configuration phase, receiving a radius specification, the radius specification specifying a particular radius around the particular location within which the mobile client device is permitted to access the resource; and
    establishing a location freshness policy, wherein establishing the location freshness policy includes choosing a threshold freshness interval based, at least in part, on the particular radius from the radius specification according to a positive correlation relationship; and
  wherein testing the location freshness value received in each authentication request against the location freshness policy includes (i) generating an affirmative location freshness result for a first authentication request whose location freshness value indicates that the amount of time that has passed since the mobile client device last determined its location is less than the threshold freshness interval and (ii) generating a negative location freshness result for a second authentication request whose location freshness value indicates that the amount of time that has passed since the mobile client device last determined its location exceeds the threshold freshness interval.

5. The method of claim 4 wherein establishing the location freshness policy further includes choosing the threshold freshness interval based, in part, on a size of the particular location from the location specification, the threshold freshness interval being positively correlated to the size of the particular location.

6. The method of claim 4 wherein establishing the location freshness policy further includes choosing the threshold freshness interval based, in part, on a current velocity of the mobile access device according to a negative correlation relationship.

7. The method of claim 4,
wherein receiving the authentication requests from the mobile client device further includes receiving a location determination from the mobile client device for each authentication request, the location determination specifying where the mobile client device is located; and
wherein generating the authentication response for each authentication request based at least in part on the location freshness result for that authentication request includes generating the authentication response partly based on the location freshness result and partly based on whether the location determination indicates that the mobile client device is located within the particular radius around the particular location.

8. The method of claim 7,
wherein the method further comprises establishing a location evaluation setting, the location evaluation setting specifying what methods are permitted be used by the mobile client device in creating the location determination to authenticate the mobile client device to the resource;
wherein receiving the authentication requests from the mobile client device further includes, for each authentication request, receiving a method value indicating what method was used by the mobile client device in creating the location determination for that authentication request; and
wherein generating the authentication response for each authentication request based at least in part on the location freshness result for that authentication request further includes generating the authentication response partly based on whether the method value is specified by the location evaluation setting.

9. The method of claim 8,
wherein establishing the location evaluation setting is performed in response to receiving a set of location evaluation technique types from the mobile client device, and
wherein establishing the location evaluation setting includes setting the location evaluation setting to the received set of location evaluation technique types.

10. The method of claim 8,
wherein establishing the location evaluation setting is performed in response to receiving a set of location evaluation technique types from an administrator of the resource, and
wherein establishing the location evaluation setting includes setting the location evaluation method to the received set of location evaluation technique types.

11. The method of claim 8 wherein establishing the location evaluation setting includes establishing the location evaluation setting based, at least in part, on the particular radius from the radius specification.

12. The method of claim 8 wherein establishing the location evaluation setting includes:
specifying a first permitted method to be used to determine the user's location as a first recourse, the first permitted method having a timeout interval; and
specifying a second permitted method to be used to determine the user's location as a second recourse upon expiration of the timeout interval of the first permitted method, the second permitted method having a lower degree of precision than the first permitted method, the second permitted method having a lower power requirement than the first permitted method.

13. The method of claim 1 wherein the method further includes:
determining whether the mobile client device is permitted to access the resource;
generating an authorization message indicating whether the mobile client device is permitted to access the resource; and
directing the authorization message to be sent to the resource.

14. A computer program product comprising a non-transitory computer-readable medium storing a set of instructions, which, when performed by a computing device, causes the computing device to authenticate a mobile client device to a resource using location services by:
receiving authentication requests from the mobile client device, the authentication requests each including a location freshness value indicating a respective amount of time that has passed since the mobile client device last determined its location;
testing the location freshness value received in each authentication request against a location freshness policy to generate a freshness result indicating whether the location freshness value complies with the location freshness policy;
generating an authentication response for each authentication request based at least in part on the location freshness result for that authentication request; and
directing the authentication responses to be sent to the resource.

15. An apparatus configured to authenticate a mobile client device to a resource using location services, the apparatus comprising:
a processor; and
memory, the memory storing a set of instructions;
wherein the processor is configured to perform the following operations:
receiving authentication requests from the mobile client device, the authentication requests each including a location freshness value indicating a respective amount of time that has passed since the mobile client device last determined its location;
testing the location freshness value received in each authentication request against a location freshness policy to generate a freshness result indicating whether the location freshness value complies with the location freshness policy;
generating an authentication response for each authentication request based at least in part on the location freshness result for that authentication request; and
directing the authentication responses to be sent to the resource.

16. The apparatus of claim 15,
wherein the processor is further configured to perform the following operations:
during a configuration phase, receiving a location specification, the location specification specifying a particular location from which the mobile client device is permitted to access the resource;

during the configuration phase, receiving a radius specification, the radius specification specifying a particular radius around the particular location within which the mobile client device is permitted to access the resource; and establishing a location freshness policy, wherein establishing the location freshness policy includes choosing a threshold freshness interval based, at least in part, on the particular radius from the radius specification according to a positive correlation relationship; and wherein the processor, when testing the location freshness value received in each authentication request against the location freshness policy, is configured to (i) generate an affirmative location freshness result for a first authentication request whose location freshness value indicates that the amount of time that has passed since the mobile client device last determined its location is less than the threshold freshness interval and (ii) generate a negative location freshness result for a second authentication request whose location freshness value indicates that the amount of time that has passed since the mobile client device last determined its location exceeds the threshold freshness interval.

17. The apparatus of claim 16, wherein the processor, when receiving the authentication requests from the mobile client device, is further configured to receive a location determination from the mobile client device for each authentication request, the location determination specifying where the mobile client device is located; and wherein the processor, when generating the authentication response for each authentication request based at least in part on the location freshness result for that authentication request, is configured to generate the authentication response partly based on the location freshness result and partly based on whether the location determination indicates that the mobile client device is located within the particular radius around the particular location.

18. The apparatus of claim 17, wherein the processor is further configured to establish a location evaluation setting based, at least in part, on the particular radius from the radius specification, the location evaluation setting specifying what methods are permitted be used by the mobile client device in creating the location determination to authenticate the mobile client device to the resource;

wherein the processor, when receiving the authentication requests from the mobile client device, is further configured to, for each authentication request, receive a method value indicating what method was used by the mobile client device in creating the location determination for that authentication request; and wherein the processor, when generating the authentication response for each authentication request based at least in part on the location freshness result for that authentication request, is further configured to generate the authentication response partly based on whether the method value is specified by the location evaluation setting.

19. The apparatus of claim 18 wherein the processor, when establishing the location evaluation setting based, at least in part on the particular radius, is configured to (A) establish the location evaluation setting to be a first set of location evaluation technique types when the particular radius is relatively small and (B) establish the location evaluation setting to be a second set of location evaluation technique types when the particular radius is relatively large, the second set of location evaluation technique types including at least one location evaluation technique type that is less precise than any of the location evaluation technique types in the first set.

20. The apparatus of claim 18 wherein the processor, when establishing the location evaluation setting, is further configured to base the location evaluation setting on a size of the particular location from the location specification, by (A) establishing the location evaluation setting to be a first set of location evaluation technique types when the size of the particular location is relatively small and (B) establishing the location evaluation setting to be a second set of location evaluation technique types when the size of the particular location is relatively large, the second set of location evaluation technique types including at least one location evaluation technique type that is less precise than any of the location evaluation technique types in the first set.

21. The apparatus of claim 18 wherein the processor, when establishing the location evaluation setting, is further configured to base the location evaluation setting on a current velocity of the mobile access device by (A) establishing the location evaluation setting to be a first set of location evaluation technique types when the current velocity is relatively high and (B) establishing the location evaluation setting to be a second set of location evaluation technique types when the current velocity is relatively low, the second set of location evaluation technique types including at least one location evaluation technique type that is less precise than any of the location evaluation technique types in the first set.

22. The apparatus of claim 18 wherein the processor, when establishing the location evaluation setting based, at least in part on the particular radius, is configured to:

select only a precise location determination technique when the particular radius is less than a first threshold;

select the precise location determination technique as well as a semi-precise location determination technique when the particular radius is between the first threshold and a second threshold, the second threshold being larger than the first threshold; and select the precise location determination technique, the semi-precise location determination technique, and an imprecise location determination technique when the particular radius exceeds the second threshold.

23. The apparatus of claim 22, wherein selecting the precise location determination technique includes selecting satellite-based location determination, and wherein selecting the semi-precise location determination technique includes selecting cellular tower triangulation.

24. The apparatus of claim 23 wherein selecting the imprecise location determination technique includes selecting a technique whereby location is determined based on availability of a wireless signal from each of a pre-established set of wireless communications networks.

25. The apparatus of claim 23 wherein selecting the imprecise location determination technique includes selecting a technique whereby location is determined based on availability of a radio signal from each of a pre-established set of radio stations.

26. The method of claim 1, wherein the method further comprises establishing a location freshness policy, wherein establishing the location freshness policy includes choosing a threshold freshness interval; and wherein testing the location freshness value received in each authentication request against the location freshness policy includes (i) generating an affirmative location freshness result for a first authentication request whose location freshness value indicates that the amount of time that has passed since the mobile client device last determined its location is less than the threshold freshness interval and (ii) generating a negative location freshness result for a second authentication request whose location freshness value indicates that the amount of time that has passed since the mobile client device last determined its location exceeds the threshold freshness interval.

* * * * *